(12) United States Patent
Lewis et al.

(10) Patent No.: US 11,210,659 B2
(45) Date of Patent: Dec. 28, 2021

(54) COMPUTING TECHNOLOGIES FOR MUSICAL PERFORMANCES

(71) Applicant: Worldcast Live Inc., New York, NY (US)

(72) Inventors: Peter L. Lewis, Rutherford, NJ (US); Jacquelin Benton, Reading (GB); George D. Skeete, Shelton, CT (US)

(73) Assignee: Worldcast Live Inc., New York, NY (US)

( * ) Notice: Subject to any disclaimer, the term of this patent is extended or adjusted under 35 U.S.C. 154(b) by 0 days.

(21) Appl. No.: 16/337,066

(22) PCT Filed: Nov. 13, 2018

(86) PCT No.: PCT/US2018/060678
§ 371 (c)(1),
(2) Date: Mar. 27, 2019

(87) PCT Pub. No.: WO2019/099357
PCT Pub. Date: May 23, 2019

(65) Prior Publication Data
US 2019/0340605 A1    Nov. 7, 2019

Related U.S. Application Data

(60) Provisional application No. 62/585,697, filed on Nov. 14, 2017.

(51) Int. Cl.
*G06Q 20/40*      (2012.01)
*G06Q 30/02*      (2012.01)
(Continued)

(52) U.S. Cl.
CPC ....... *G06Q 20/3678* (2013.01); *G06F 16/632* (2019.01); *H04L 67/1097* (2013.01); *G06Q 2220/00* (2013.01)

(58) Field of Classification Search
CPC .. G06Q 20/00–425; G06Q 2220/00–18; G06F 16/00–986; H04L 67/00–42
See application file for complete search history.

(56) References Cited

U.S. PATENT DOCUMENTS 8,370,357 B1    2/2013   Gudmundsson et al.
9,495,688 B2   11/2016   Stricklin
(Continued)

FOREIGN PATENT DOCUMENTS

WO    WO2015-034572    3/2015

OTHER PUBLICATIONS

Lahiri et al., Oracle TimesTen: An In-Memory Database for Enterprise Applications, IEEE, 2013 (Year: 2013).*
(Continued)

*Primary Examiner* — John W Hayes
*Assistant Examiner* — Chenyuh Kuo
(74) *Attorney, Agent, or Firm* — Dentons US LLP (57) ABSTRACT

A method comprises: receiving, via a processor, an audio content of a first file; generating, via the processor, a first acoustic fingerprint from the audio content; comparing, via the processor, the first acoustic fingerprint against a second acoustic fingerprint stored in a record of a database, wherein the record includes an identifier; identifying, via the processor, a match between the first acoustic fingerprint and the second acoustic fingerprint; accessing, via the processor, the identifier responsive to the match; performing, via the processor, an assignment of a digital token from a first user to a second user responsive to the match, wherein the identifier identifies the second user; and alerting, via the processor, the second user of the assignment.

13 Claims, 9 Drawing Sheets

(51) Int. Cl.
*G06Q 20/32* (2012.01)
*G06Q 20/34* (2012.01)
*G06Q 20/38* (2012.01)
*G06Q 20/36* (2012.01)
*G06F 16/632* (2019.01)
*H04L 29/08* (2006.01)

(56) References Cited

U.S. PATENT DOCUMENTS

| | | | |
|---|---|---|---|
| 10,614,430 B2* | 4/2020 | Armstrong | H04W 4/33 |
| 2006/0095344 A1 | 5/2006 | Nakfoor | |
| 2008/0103812 A1 | 5/2008 | Tobin et al. | |
| 2008/0154713 A1* | 6/2008 | Buckley | G06Q 20/20 |
| | | | 705/14.27 |
| 2010/0114968 A1 | 5/2010 | Dean | |
| 2010/0169933 A1 | 7/2010 | Wang | |
| 2013/0325525 A1 | 12/2013 | Boyd | |
| 2014/0073277 A1* | 3/2014 | Iyer | H04B 1/06 |
| | | | 455/205 |
| 2014/0214532 A1 | 7/2014 | Barton et al. | |
| 2014/0324616 A1 | 10/2014 | Proietti | |
| 2014/0336798 A1* | 11/2014 | Emerson, III | H04H 60/37 |
| | | | 700/94 |
| 2015/0269806 A1 | 9/2015 | Richards et al. | |
| 2017/0068910 A1 | 3/2017 | Burroughs | |
| 2017/0116693 A1 | 4/2017 | Rae et al. | |
| 2017/0116694 A1* | 4/2017 | Gabie | G06Q 50/188 |
| 2017/0214522 A1* | 7/2017 | Code | G06Q 20/3672 |
| 2019/0089525 A1* | 3/2019 | Roets | H04L 9/3213 |
| 2019/0098445 A1* | 3/2019 | Hu | H04W 4/33 |

OTHER PUBLICATIONS

How concert sponsors can engage with small venues at scale, 2017, https://www.eventbrite.com/blog/concert-sponsors-ds00/ downloaded from Internet Oct. 18, 2017 (9 pages).

International Search Report and Written Opinion dated Mar. 6, 2019 in related International Application No. PCT/US2018/060678 filed Nov. 13, 2018 (8 pages).

* cited by examiner

COMPUTING TECHNOLOGIES FOR MUSICAL PERFORMANCES

CROSS-REFERENCE TO RELATED APPLICATIONS

This application claims a benefit of priority to an International Patent Application PCT/US18/60678 filed 13 Nov. 2018; which claims a benefit of U.S. Provisional Application 62/585,697 filed on 14 Nov. 2017, each of which is herein incorporated by reference for all purposes.

TECHNICAL FIELD

This disclosure relates to computing.

BACKGROUND

There is a desire for a computing technology to electronically incentivize a music performer (e.g. a disc jockey (DJ)) to electronically perform a music piece (e.g. a song) in order to provide a licensing revenue for such performance to a music artist associated with the music piece (e.g. an indie artist). Also, there is a desire for a computing technology to enable an electronic engagement of the music performer with an audience member in a music venue before, during, and after the music performer electronically performs the music piece, while simultaneously electronically promoting various physical products (e.g. a beverage), at the music venue. However, such technologies do not exist. Therefore, this disclosure enables such technologies.

SUMMARY

In an embodiment, a method comprises: receiving, via a server, an audio content from a DJ client as the audio content is being played on the DJ client; accessing, via the server, a database responsive to the audio content being received, wherein the database stores a plurality of music piece identifiers and a plurality of crypto-asset wallet addresses, wherein the music piece identifiers correspond to the crypto-asset wallet addresses; performing, via the server, a comparison between the audio content and the music piece identifiers based on the database being accessed; identifying, via the server, a match between the audio content and at least one of the music piece identifiers based on the comparison; identifying, via the server, at least one of the crypto-asset wallet addresses corresponding to the at least one of the music piece identifiers responsive to the match; requesting, via the server, as the audio content is being played on the DJ client, a blockchain node to record an assignment of a digital utility token from a first crypto-asset wallet address to a second crypto-asset wallet address responsive to the match, wherein the first crypto-asset wallet address is associated with a user of the server, wherein the second crypto-asset wallet address is the at least one of the crypto-asset wallet addresses, wherein the blockchain node is remote from the server and the DJ client, wherein the user is not associated with the DJ client; and notifying, via the server, a music artist client of the assignment, wherein the user is not associated with the music artist client, wherein the blockchain node is remote from the music artist client.

DETAILED DESCRIPTION

This disclosure is now described more fully with reference to a set of accompanying drawings, in which some example embodiments of this disclosure are shown. This disclosure may, however, be embodied in many different forms and should not be construed as necessarily being limited to the example embodiments disclosed herein. Rather, these example embodiments are provided so that this disclosure is thorough and complete, and fully conveys various concepts of this disclosure to skilled artisans.

Generally, as shown in FIGS. 1-9, this disclosure discloses a system that can include a performance venue, a server, a performer client, a sponsor client, an artist client, a performance venue client, and an audience member client. The performance venue can include a defined area (e.g. indoors, outdoors, aboveground, belowground) where a musical performance can be taking place (e.g. bar, club, restaurant, retail store, sneaker store, party room, auditorium, concert hall, warehouse, gym, arena, stadium, bus, airplane, tourist boat, water taxi, ferry, cruise liner, yacht, park). The server (e.g. web server, application server, cloud computing server, virtual server, physical server) can be remote from the performance venue. The server hosts a digital map (e.g. 3D scan) of the performance venue, as generated via the performance venue client (e.g. camera scanning) and uploaded from the performance venue client to the server. The performer client (e.g. desktop, laptop, smartphone, tablet) can be remote from the server and local to the performance venue. The performer client (e.g. DJ client) can host or access a DJ hardware (e.g. camera, microphone, mixer, musical instrument, turntable, headphone, controller, CDJ) or a DJ software (e.g. MIXXX, Traktor). The sponsor client (e.g. desktop, laptop, smartphone, tablet) can be remote from the server and the performance venue. The performance venue client (e.g. desktop, laptop, smartphone, tablet) can be remote from the server and local to the performance venue. The artist client (e.g. desktop, laptop, smartphone, tablet) can be remote from the server and the performance venue. The audience member client (e.g. smartphone, tablet, eyewear frame, wearable) can be remote from the server and local to the performance venue. The audience member client can include a camera.

The performance venue externally (e.g. within about 50, 45, 40, 35, 30, 25, 20, 15, 10, or 5 feet from an entrance door or gate) and internally (e.g. within or surrounding a performance area, next to or within a bar counter) can host or support a plurality of beacons (e.g. Bluetooth beacon, iBeacon, AltBeacon, URIBeacon, Eddystone beacon) that can wirelessly interface (e.g. unique identifier broadcasting, messaging) with the audience member client. The beacons can be positioned internal or external to the performance venue. The beacons can be battery powered or plugged into an outlet (e.g. 110V, 220V) or a device port (e.g. USB, micro-USB, Lightening).

The server can be maintained via a server user profile (e.g. an administrator profile). The server can be in communication with the performer client via a performer user profile (e.g. through mobile app, web application). The server can be in communication with the sponsor client via a sponsor user profile (e.g. through mobile app, web application). The server can be in communication with the performance venue client via a venue user profile (e.g. through mobile app, web application). The server can be in communication with the artist client via an artist user profile (e.g. through mobile app, web application). The server can be in communication with the an audience member client via an audience member user profile (e.g. through mobile app, web application).

The server can be in communication (e.g. request-response mode) with a node of a blockchain (e.g. Ethereum-based, Ethereum Classic-based). The node of the blockchain can be in communication with other nodes of the blockchain. The server can operate or avoid operating as the node (e.g. initiating node). The blockchain can be associated with an initial coin offering (ICO) or another form of a server-based crypto digital utility token generation event. The ICO can enable an initial assignment (e.g. via digital wallets, cryptocurrency wallets) of a plurality of crypto digital utility tokens (e.g. fungible, non-fungible) to the server user profile, the performer user profile, the sponsor user profile the venue user profile, the artist user profile, and the audience member user profile.

The server can host or access a database (e.g. relational, in-memory, graphical, NoSQL, active database, distributed database, parallel database, real-time database, unstructured database). The database can contain a plurality of records (e.g. with fields, without fields). The records can contain a plurality of music piece identifiers (e.g. acoustic fingerprints). The records can contain a plurality of crypto-asset wallet addresses (e.g. digital wallet address, cryptocurrency wallet address, digital utility token wallet address) associated (e.g. logical relationship) with the music piece identifiers. The addresses can correspond to the music piece identifiers in a one-to-many correspondence, although other forms of correspondence are possible (e.g. one-to-one, many-to-one, many-to-many). Note that the records can simultaneously store the addresses and the music piece identifiers (e.g. single record stores address and music piece identifier) or some of the records store the music piece identifiers and some of the records store the addresses, which can be related to each other via another set of records (e.g. records of music piece identifiers relate to records of addresses via an intermediary set of records).

Internal to the performance venue, the performer client can locally run or remotely access a music performance software (e.g. Serato, Mixxx, Virtual DJ, Traktor, Pioneer DJ, Ableton) that can perform a music related function (e.g. manage local or remote audio content, play local or remote audio content, generate local or remote audio effect, mix local or remote tracks, create or edit local or remote playlists). As such, the performer client can perform a music piece (e.g. a song), whether via playing a local file (e.g. MP3, WAV, AAC, MIDI, WMA) or receiving a network stream (e.g. audio, video), via the music performance software based on the performer user profile, in the performance venue associated with the performance venue client.

During such performance, the music performance software can compare the music piece being performed against the database in real-time (e.g. acoustic fingerprint matching). For example, such comparison can include real-time generation of an acoustic fingerprint of the music piece being performed or accessing an acoustic fingerprint stored in a database (e.g. local, remote) based on an identifier (e.g. file name, file metadata) and then real-time comparing the acoustic fingerprint against the acoustic fingerprints stored in the database. Note that such comparison can take place before the music piece begins to be performed (e.g. within a predetermined time period projected based on estimated or actual remaining playtime of another music piece before the music piece), when the music piece begins to be performed, during the music piece being performed, before the music piece ends (e.g. within a predetermined time period projected based on estimated or actual remaining playtime of the music piece), when the music piece ends, or after the music piece ends (e.g. within a predetermined time period after ending the music piece).

Upon matching, the server identifies the music artist profile relevant to the match in the database (e.g. via a profile name being identified within a same record of the database as the matching acoustic fingerprint or via being pointed or referred to from one record of the database to another record of the database). Then, the server communicates with the node of the blockchain and requests an assignment of a digital utility token associated with the blockchain. The assignment can take place from the server user profile to the music artist profile, with the digital utility token being maintained via the node of the blockchain. Then, the server notifies the music artist client of such assignment via the music artist user profile (e.g. prompt, alert, chat message, email message, social network message, text message, phone call).

The server can also receive a message (e.g. chat message, email message, social network message, text message) from the audience member client located in the performance venue, as the performer client is located in the performance venue and is performing the music piece in the performance venue via the music performance software. The message can include a text content, a still image content, a video content, an audio content, or an emoji content. The server can communicate (e.g. send, share, forward, push) the message to the performer client before, during, or after the music piece being performed via the music performance software. The music performance software can visually present (e.g. display) the message during or after the music piece being performed via the music performance software. As such, the server can cause the message to be presented on the performer client, while the performer client is running the music performance software.

The music performance software can be programmed such that a reply (e.g. chat message, email message, social network message, text message) to the message can be locally or remotely generated (e.g. input from scratch, use of response templates selected based on matching content). The reply can contain a text content, a still image content, a video content, an audio content, a barcode content, or an emoji content. As such, the performer client can generate the reply and send the reply to the server such that the server can communicate (e.g. send, share, forward, push) the reply to the audience member client. Then, the server communicates with the node of the blockchain and requests an assignment of a digital utility token associated with the blockchain. The assignment can take place from the server user profile to the performer user profile, with the digital utility token being maintained via the node of the blockchain. The assignment can be responsive to the reply being received by the server. Then, the server notifies the performer client of such assignment via the performer user profile (e.g. prompt, alert, chat message, email message, social network message, text message, phone call).

External to the performance venue, before the audience member client is positioned within the performance venue (e.g. waiting on line), the beacons can wirelessly send (e.g. serially, in parallel) a plurality of unique identifiers to the audience member client when in proximity therewith. Such sending can be vary based on time of day or day of week or day of month or weekend relative to workday. The audience member client identifies (e.g. through mobile app, web application) a plurality of messages associated with the unique identifiers. The messages are locally available (e.g. pre-downloaded, cached) or downloaded on-demand (e.g. request to access) from the server. The audience member client can display at least one the messages based on a set of criteria or satisfaction or non-satisfaction of a threshold, such as local time, local date, a demographic associated with the audience member client. The messages can contain a text content, a still image content, a video content, an audio content, a barcode content, or an emoji content. For example, the beacons are transmitting the signals with the unique identifiers. The audience member client (e.g. mobile app) can pick up the unique identifiers, recognize the beacons as friendly, find what specific message that specific beacon is tied onto, and present those messages (e.g. allowed to skip line, coupon, barcode, prize).

Internal to the performance venue, the beacons operate as a plurality of reference points for a positional orientation of the audience member client (e.g. signal triangulation). The positional orientation can also be supplemented via an indoor or outdoor positioning system, along with the digital map. As such, the audience member client is able to point (e.g. raise and scan) the camera (e.g. at objects, people, furniture, ceiling, wall, floor) and thereby display an augmented reality content, without using a marker (e.g. barcode) to trigger the augmented reality content. The augmented reality content can contain a text content, a still image content, a video content, an audio content, a barcode content, or an emoji content. The augmented reality content can be interactive. The augmented reality content can relate to a position or the positional orientation of the audience member client.

A digital utility token can be assigned from the sponsor user profile to the server user profile in order to promote various sponsor products (e.g. goods, services, physical, digital) via the augmented reality content (e.g. floating or levitating objects, goods, garments, foods, beverage bottles) at the performance venue based on the beacons external and internal to the performance venue being maintained via the venue client based on the venue client profile and based on the augmented reality content displaying the various sponsor products on the audience member client. Likewise, the sponsor client shares revenue with the venue client, such as via digital utility token assignment from the sponsor user profile to the venue user profile, for physically hosting the various products associated with the sponsor client, including those physical products being promoted via the augmented reality. The audience member client can be notified of the various products via the beacons, whether internal or external to the performance venue, where the audience member client can uses the camera for optically scanning the performance venue in order to display the augmented reality thereon. The scanning of performance venue (e.g. in order to create the digital map) by the venue client is rewarded for interaction by points convertible into digital utility tokens that are convertible into cryptocurrency hosted via another blockchain distinct from the blockchain. The digital utility tokens can be maintained via the blockchain.

Note that this disclosure may be embodied in many different forms and should not be construed as necessarily being limited to various embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected," or "coupled" to another element, then the element can be directly on, connected, or coupled to another element or intervening elements can be present, including indirect or direct variants. In contrast, when an element is referred to as being "directly connected" or "directly coupled" to another element, then there are no intervening elements present.

As used herein, various singular forms "a," "an" and "the" are intended to include various plural forms as well, unless specific context clearly indicates otherwise.

As used herein, various presence verbs "comprises," "includes" or "comprising," "including" when used in this specification, specify a presence of stated features, integers, steps, operations, elements, or components, but do not preclude the presence or addition of one or more other features, integers, steps, operations, elements, components, or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

As used herein, the term "about" and/or "substantially" refers to a +/−10% variation from the nominal value/term. Such variation is always included in any given.

As used herein, unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized or overly formal sense unless expressly so defined herein.

Figure 1:
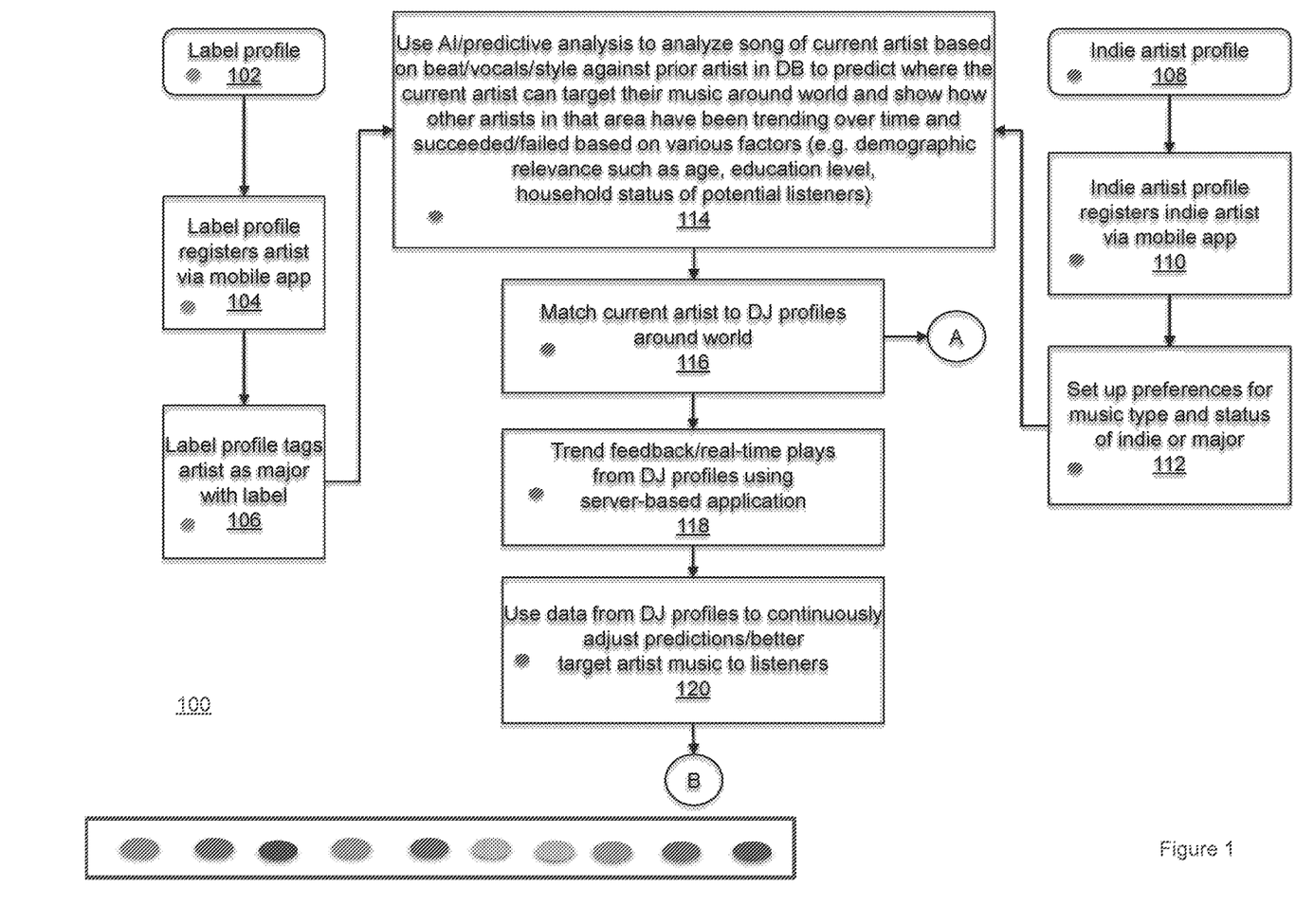
FIGS. 1-8 show a flowchart an embodiment of a process of computing according to this disclosure.

As shown in FIG. 1, in block 102, based on communication with the server, a computer (e.g. smartphone, tablet, desktop, laptop, wearable) creates a music label profile (e.g. mobile app, web application). In block 104, based on communication with the server, the music label profile is used to register an artist in block 104 (e.g. mobile app, web application). In block 106, based on communication with the server, the music label profile tags the artist as a major artist with a music label associated with the music label profile (e.g. mobile app, web application). In block 108, based on communication with the sever, a computer (e.g. smartphone, tablet, desktop, laptop, wearable) creates an indie artist profile (e.g. mobile app, web application). In block 110, based on communication with the sever, the indie artist profile is used to register an indie artist associated with the indie artist profile (e.g. mobile app, web application). In block 112, based on communication with the sever, the indie artist profile is used to set up preferences for music type and status of indie artist or major artist.

In block 114, the server employs artificial intelligence or predictive analysis (e.g. machine learning, decision tree learning, association rule learning, neural networks, deep learning, inductive logic programming, support vector machines, clustering, Bayesian networks, representation learning) to analyze song of current artist based on beat/vocals/style against prior artist in the database to predict where the current artist can target their music around world and show how other artists in that area have been trending over time and succeeded/failed based on various factors (e.g. demographic relevance such as age, education level, household status of potential listeners).

In block 116, the server match current artist profile to DJ profiles around world. In block 118, the server trends feedback/real-time plays from DJ profiles using server-based application. In block 120, the server uses data from DJ profiles to continuously adjust predictions/better target artist music to listeners For example, a trending process can include an entity (e.g. desktop, laptop, smartphone, tablet, wearable) avails a music file to a plurality of entertainers for entertainment use. The entity can include an operator of a website, a performer and/or a music record label. The availing including uploading and/or sharing, such as via a network protocol, which can be peer-to-peer and/or non-peer-to-peer. The file can include a MP3 file, a WAV file and so forth. Alternatively, the music file can include at least a portion of network stream. The file including at least one sound performance, but can include a plurality of sound performance, whether related or unrelated to each other in any way. The file including at least a sound performance, but can include a video performance as well, which can be of the sound performance or some other performance, act and/or event. The video performance can be any type, such live, recorded and/or so forth. The sound performance can include any sound performance, such as a song, an opera tune, an instrumental piece, a classical piece, a mix, a choice, an orchestra, a band and/or any other sound performance. The entertainers can include as described herein. The entertainment use including using the file during an entertainment session, such as a DJ session. Such availing is via a server.

The entity obtains file access data based on the availing. The file access data including information relating to access of the file, such as who accessed the file, when the file was accessed, from where was the file accessed, how many accesses were there, what type of file access, such as stream and/or download, how was the file accessed, and/or so forth. Such obtaining can be performed in real-time, delayed manner or periodically. Such access data is stored in a database.

The entity obtains feedback data from the entertainers based on the use of the file. The feedback including information relating to how audience is reacting to playing the file, how did the entertainer perform the song, various song and/or entertainer performance characteristics, various locale characteristics and/or so forth. Such obtaining can be performed in real-time, delayed manner or periodically and/or can include a questionnaire. For example, the feedback can be based at least in part on a mode of file play, such as a gig play mode, a club play mode, a radio play mode, a push more mode, a make video mode, a buy song mode and/or others. The feedback can also be based at least in part on content characteristics, such as vocals, beat, tempo, genre, performer and/or so forth. Such feedback data is stored in a database.

The entity applies the file use data and the feedback data to demographic data. The applying including correlating. The demographic data can include private data, public data and/or any combination thereof. The demographic data can include census data. The demographic data can include information such as income, gender, location, race, education, ethnicity, household data, criminal data, age, health, business ownership, technology usage and/or so forth. The demographic data can include any quantifiable statistics of any given population. The demographic data can include at least one quantifiable subset within a given population sample which characterize that population at a specific point in time. The demographic data can include projected statistical data. The demographic data can include domestic data, international data and/or any other combination thereof. Such application can be performed in real-time, delayed manner or periodically. Such application via a server.

The entity determines relationships based on the applying. The entity can determine trending information for the performer, the collection of songs and/or the song. The trending information can include future projections for the performer, the collection of songs and/or the song. The trending information can be used for prediction and/or forecasting for improved marketing and/or promotions. Such determination can be performed in real-time, delayed manner or periodically. Such determination can include data, such as download count by location, listen count by location, social network post counts, feedback by location and live session play info by location.

The entity is informed of the relationships. Such informing can be done via any visual manner, such as graphs, charts, diagrams, texts, grids and/or others. Such informing allows obtaining predictive results on demographic shifts in music likes and map correlations between any aspect of demographic data, such as income, age, education, location, sex, race and so forth, and music consumptions based on the entertainers. Such informing can be via localized, remote and/or any other computing manner. Such informing allows the entity to determine where music is trending in different locations based on past trends and predictive analysis for future music likes by locations. Such informing also allows the entity to determine where to focus marketing resources and/or touring based on the DJs trending data and which locations is using their songs the most. Such informing also allows the entity to track their content and focus marketing resources instead of going to random locations and cities for promotion. Such informing can be performed in real-time, such as via alerts, including at least one of a message, like an email, a text message, an app message and/or so forth. Such informing can also be performed on a delayed basis or periodically.

Note that trending data can be mined for relationships and/or trends based at least in part on demographic data. For example, the trending data is used to trend genre changes by location based on census data and DJ information. The census data can include information from prior years. Such census data can aid in trend determination via use file data to predict future trends in music and specific artist growth. The artist can use the data to find out what is the demographic break down of any area around the world where their track is popular or not popular. Such processing provides the artist with a more precise way to figure out the buzz and/or popularity of their music and use less marketing money to promote in the right areas. Via the DJs, such technology enables collective control of the growth of the song and hence song movement up the charts.

Figure 2:
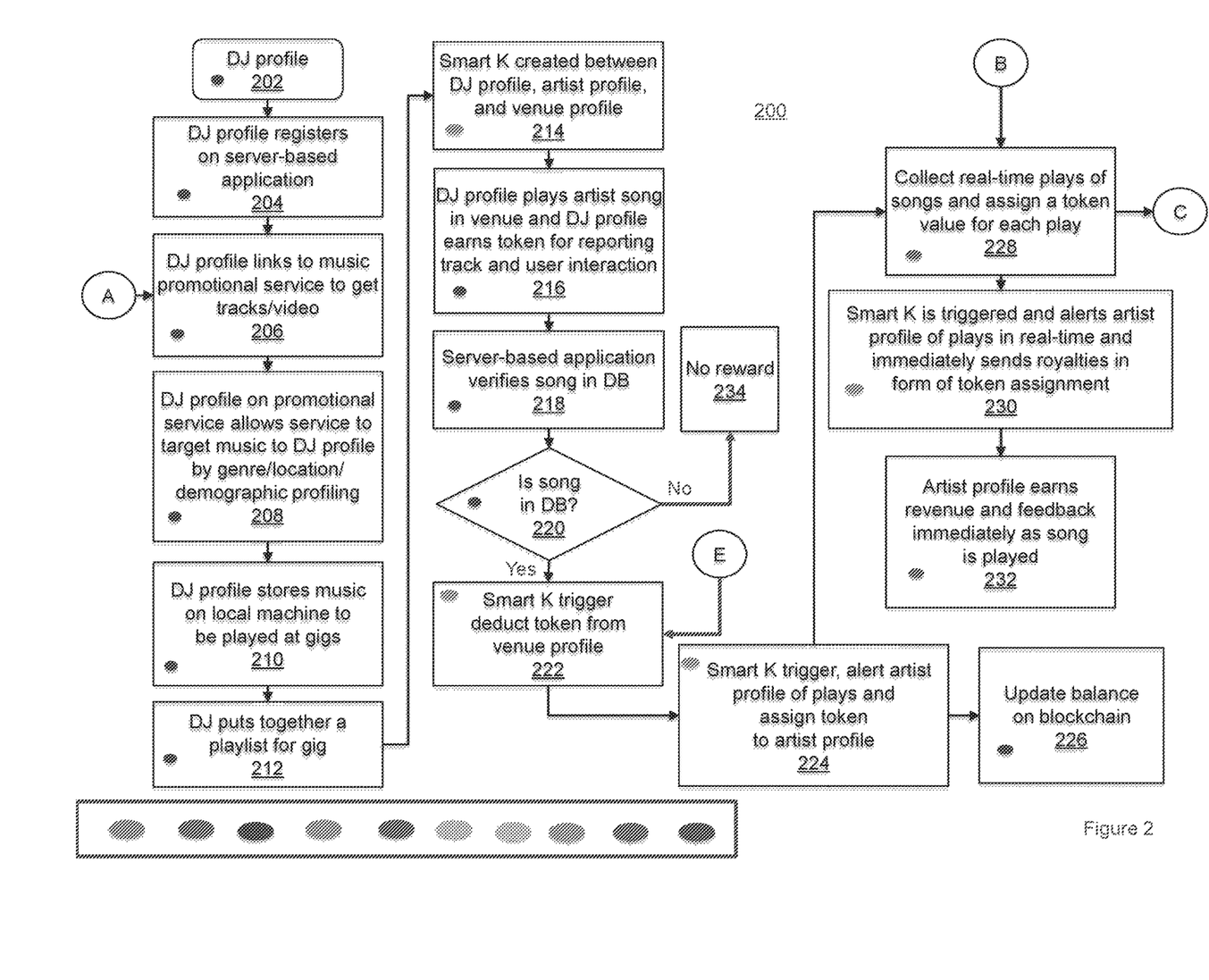

As shown in FIG. 2, in block 202, based on communication with the server, a computer (e.g. smartphone, tablet, desktop, laptop, wearable) creates a DJ profile (e.g. mobile app, web application). In block 204, based on communication with the server, the DJ profile registers with the server. In block 206, based on communication with the server, the DJ profile links to music promotional service to get tracks/video. In block 208, based on communication with the server, the DJ profile on promotional service allows service to target music to DJ profile by genre/location/demographic profiling. In block 210, based on communication with the server, the DJ profile stores music on local machine to be played at gigs (e.g. performance venue). In block 212, based on communication with the server, the DJ profile puts together a playlist for a gig. In block 214, based on communication with the server, a smart contract is created between the DJ profile, the artist profile, and the performance venue profile. Note that the smart contract can be associated or hosted on the node of the blockchain or another node of another blockchain (e.g. Ethereum-based). In block 216, based on communication with the server, the DJ profile plays an artist song in the performance venue and the DJ profile earns a digital utility token from the server user profile for reporting track and user interaction. In block 218, the server verifies the artist song against the database. In block 220, the server determines whether the artist song matches to an acoustic fingerprint in the database. In block 222, based on the server determining that the artist song matches the acoustic fingerprint in the database, the server triggers the smart contract to deduct a digital utility token from the performance venue profile. In block 224, the server as triggered based on the smart contract, the artist profile of plays and assign a digital token from the server user profile to the artist profile. In block 226, the server communicates with the node and updates digital utility token balance on the blockchain. In block 228, the server collects real-time plays of songs and assign a digital utility token value for each play in real-time based on communicating with the node of the blockchain. In block 230, the server triggers the smart contract and alerts the artist profile of plays in real-time and immediately or after predetermined delay sends royalties in a form of digital utility token assignment from the server user profile. In block 232, based on the digital utility token assignment, the artist profile earns revenue and feedback immediately as song is played. In block, based on the server determining that the artist song does not matches the acoustic fingerprint in the database, the server does not reward the artist profile.

Figure 3:
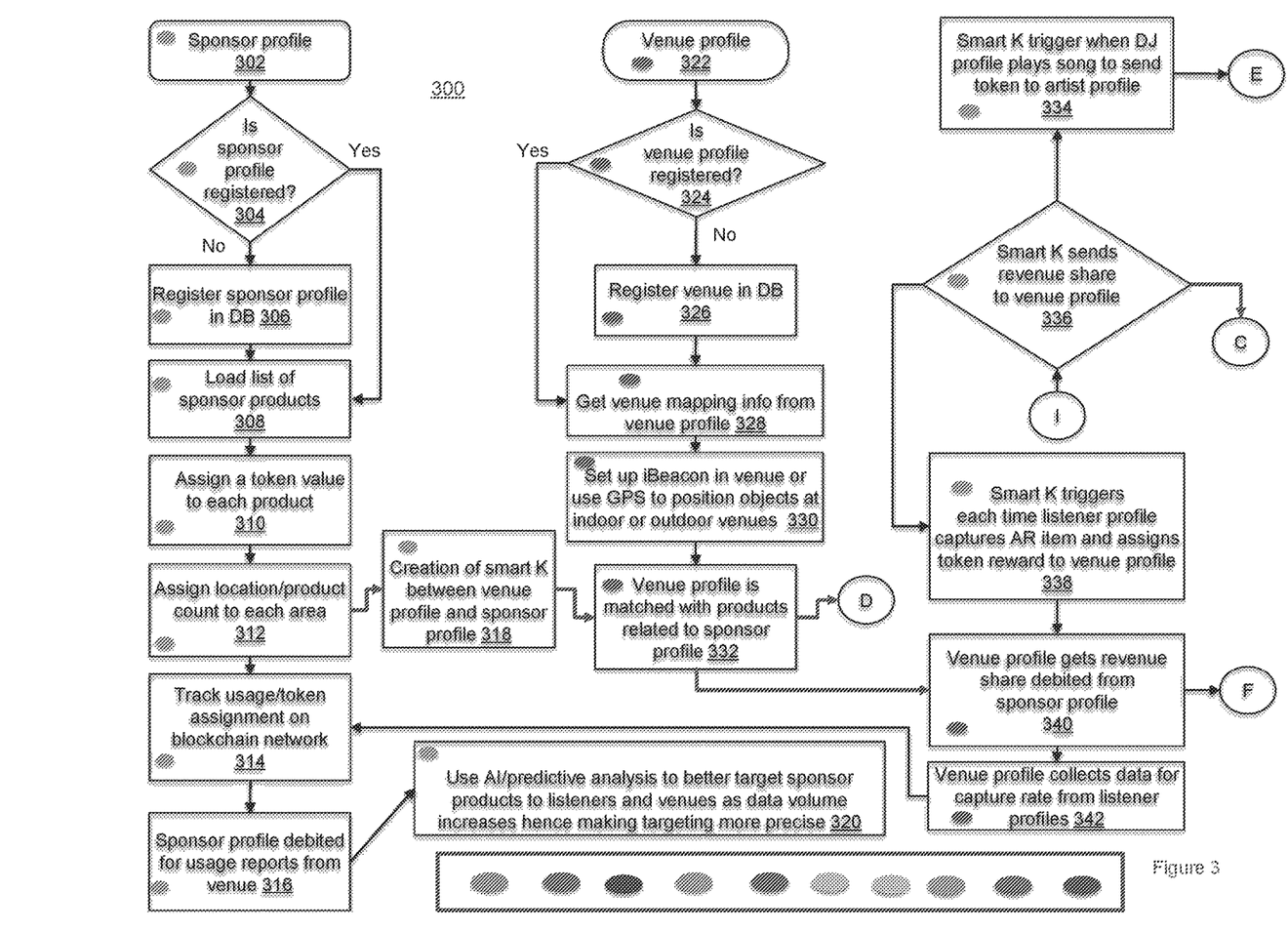

As shown in FIG. 3, in block 302, a computer (e.g. smartphone, tablet, desktop, laptop, wearable) creates a sponsor profile (e.g. mobile app, web application). In block 304, the server determines whether the sponsor profile is registered therewith. In block 306, based on the server determining that the sponsor profile is not registered, then based on communication with the server, the sponsor profile registers with the server. In block 308, the server load list of sponsor products (e.g. goods, services). In block 310, based on communication with the server, the sponsor profile assigns a digital utility token value to each sponsor product. In block 312, based on communication with the server, the sponsor profile assigns location/product count to each geographical area or performance venue. In block 314, the server tracks usage/token assignment on the node of the blockchain. In block 316, the server debits the sponsor profile for usage reports from venue. This debit is through a digital utility token and assigned to the server user profile. In block 318, the server requests creation of a smart contract between the performance venue profile and the sponsor profile. Note that the smart contract can be associated or hosted on the node of the blockchain or another node of another blockchain (e.g. Ethereum-based). In block 320, the server employs artificial intelligence or predictive analysis (e.g. machine learning, decision tree learning, association rule learning, neural networks, deep learning, inductive logic programming, support vector machines, clustering, Bayesian networks, representation learning) to better target sponsor products to listener profiles and performance venues as data volume increases hence making targeting more precise.

In block 322, a computer (e.g. smartphone, tablet, desktop, laptop, wearable) creates a performance venue profile (e.g. mobile app, web application). In block 324, the server determines whether the performance venue profile is registered therewith. In block 326, based on the server determining that the performance venue profile is not registered, then based on communication with the server, the performance venue profile registers with the server. In block 328, the server receives venue mapping (e.g. digital indoor map) info from the performance venue profile. In block 330, the performance venue profile enables configuration of a Bluetooth beacon in the performance venue or uses a geolocation chip (e.g. GPS, GLONASS) to position an objects at the performance venue (e.g. indoor, outdoor). In block 332, the performance venue profile is matched with the sponsor products related to the sponsor profile. In block 334, the server triggers the smart contract when the DJ profile plays a song to send a digital token to the artist profile. In block 336, the server causes the smart contract to send revenue share from the server user profile to the performance venue profile. In block 338, the server triggers the smart contract each time a listener profile (e.g. audience member profile) captures (e.g. via camera as presented on client display) an augmented reality item and assigns a digital utility token reward from the server user profile to the performance venue profile. In block 340, the server enables the performance venue profile to get a revenue share debited from the sponsor profile via the server user profile or directly. In block 342, the server enables the performance venue profile to collect data for capture rate from listener profiles.

Figure 4:
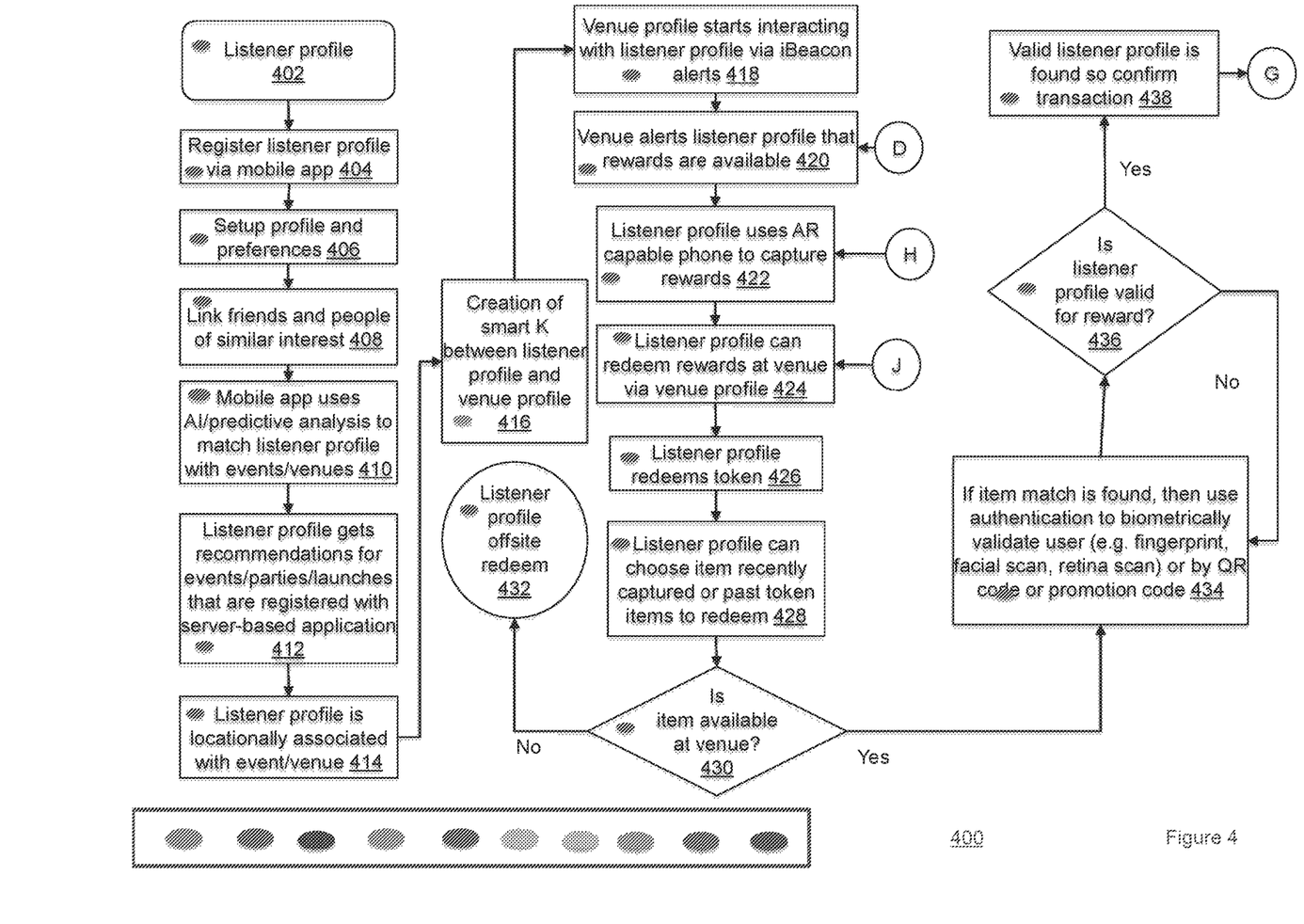

As shown in FIG. 4, in block 402, a computer (e.g. smartphone, tablet, desktop, laptop, wearable) creates a listener profile (e.g. mobile app, web application). The listener profile can be an audience member profile. In block 404, based on communication with the server, the listener profile is registered with the server. In block 406, based on communication with the server, the listener profile sets up profile and preferences. In block 408, based on communication with the server, the listener profile links with friends and people of similar interest who are also registered with the server. In block 410, the server employs artificial intelligence or predictive analysis (e.g. machine learning, decision tree learning, association rule learning, neural networks, deep learning, inductive logic programming, support vector machines, clustering, Bayesian networks, representation learning) to match the listener profiles with an event taking place at the performance venue. In block 412, the server sends the listener profile recommendations for events/parties/launches that are registered therewith. In block 414, the server locationally associates (e.g. based on IP address, receiving geolocation from the listener profile) the listener profile with the event at the performance venue. In block 416, the server creates a smart contract between the listener profile and the venue profile. Note that the smart contract can be associated or hosted on the node of the blockchain or another node of another blockchain (e.g. Ethereum-based). In block 418, based on communication with the server, the performance venue profile starts interacting (e.g. messaging) with listener profile via beacon alerts. In block 420, based on communication with the server, the performance venue profile alerts (e.g. messaging, email, chat, text, social media) the listener profile that rewards are available. In block 422, based on communication with the server, the listener profile uses an augmented reality capable smartphone to capture augmented reality rewards. In block 424, based on communication with the server, the listener profile can redeem rewards at the performance venue via the venue profile. In block 426, based on communication with the server, the listener profile can redeem a digital utility token. In block 428, based on communication with the server, the listener profile can choose an item recently captured via the augmented reality or past token items to redeem. In block 430, the server determines whether the item is physically available at the performance venue (e.g. inventory records, RFID tags). In block 434, based on the server determining that the item is physically available at the performance venue, then the server uses authentication to biometrically validate user (e.g. fingerprint, facial scan, retina scan) or by barcode (e.g. QR code) or promotion code or via NFC. In block 436, the server determines whether the listener profile is valid for a reward. In block 438, based on the server determining that the listener profile is valid for the reward, the server confirms a transaction involving the reward. Otherwise, the server requests authentication again.

Figure 5:
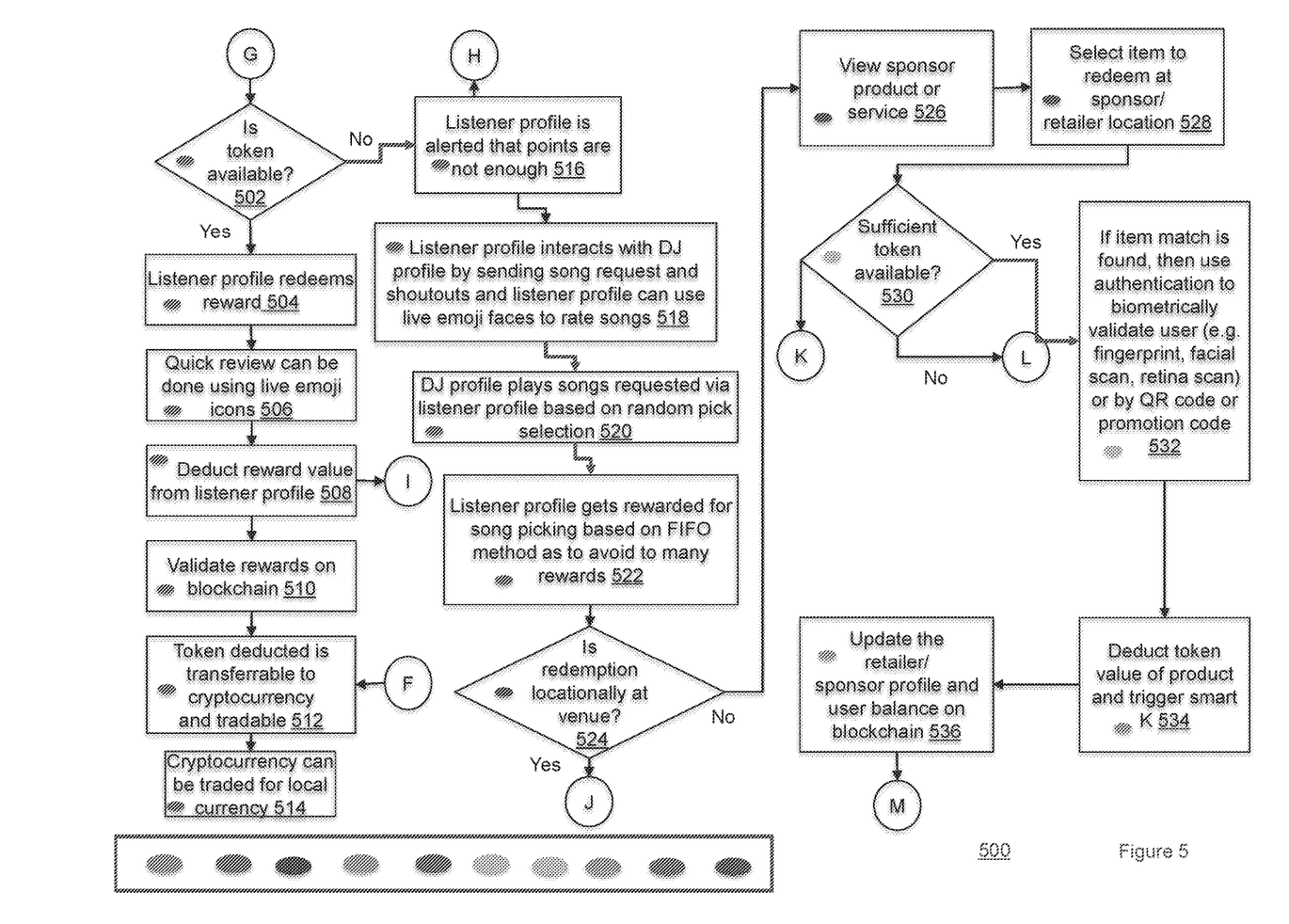

As shown in FIG. 5, in block 502, the server determines whether a digital utility token is available. In block 504, based on the server determining that the digital utility token is available, the server allows the listener profile to redeem the reward. In block 506, based on communication with the server, the listener profile is enabled to perform quick reviews using live emoji icons. In block 508, the server deducts reward value (e.g. a digital utility token) from the listener profile. In block 510, based on communication with the server, the listener profile can validate rewards on the node of the blockchain. In block 512, the server deducts a digital utility token and is transferrable to cryptocurrency (e.g. Bitcoin) and tradable. In block 514, the server enables the listener profile to trade or convert the cryptocurrency can be traded for local currency (e.g. fiat). In block 516, based on communication with the server, the listener profile is alerted (e.g. messaging, email, text, chat, social media) that points are not enough. In block 518, based on communication with the server, the listener profile interacts with the DJ profile by sending song requests (e.g. messaging, texting, email, chat, social media) or shout-outs (e.g. messaging, texting, email, chat, social media). Also, the listener profile can use live emoji faces to rate songs. In block 520, the server enables the DJ profile to play songs requested via the listener profile based on random pick selection at the music performance software. In block 522, based on communication with the server, the listener profile gets rewarded for song picking based on first-in-first-out (FIFO) method as to avoid too many rewards (e.g. assignments of digital utility tokens). In block 524, the server determines whether a redemption is possible locationally at the performance venue. In block 526, based on the server determining that the redemption is not possible locationally at the performance venue, the server enables the listener profile to view a sponsor product or service. In block 528, the server enables the listener profile to select an item to reed at a sponsor (e.g. brick-and-mortar store) or at a retailer location (e.g. brick-and-mortar store). In block 530, the server communicates with the node of the blockchain to determine whether there is a sufficient digital utility token amount is available. In block 532, based on the server determining that the sufficient digital utility token amount is available, the server can use authentication to biometrically validate user (e.g. fingerprint, facial scan, retina scan) or by barcode (e.g. QR code) or promotion code or via NFC. In block 532, the server deducts a digital utility token value of a product and triggers a smart contract. In block 534, the server communicates with the node of the blockchain to update the sponsor profile (e.g. a retailer profile) and a user balance on the blockchain.

Figure 6:
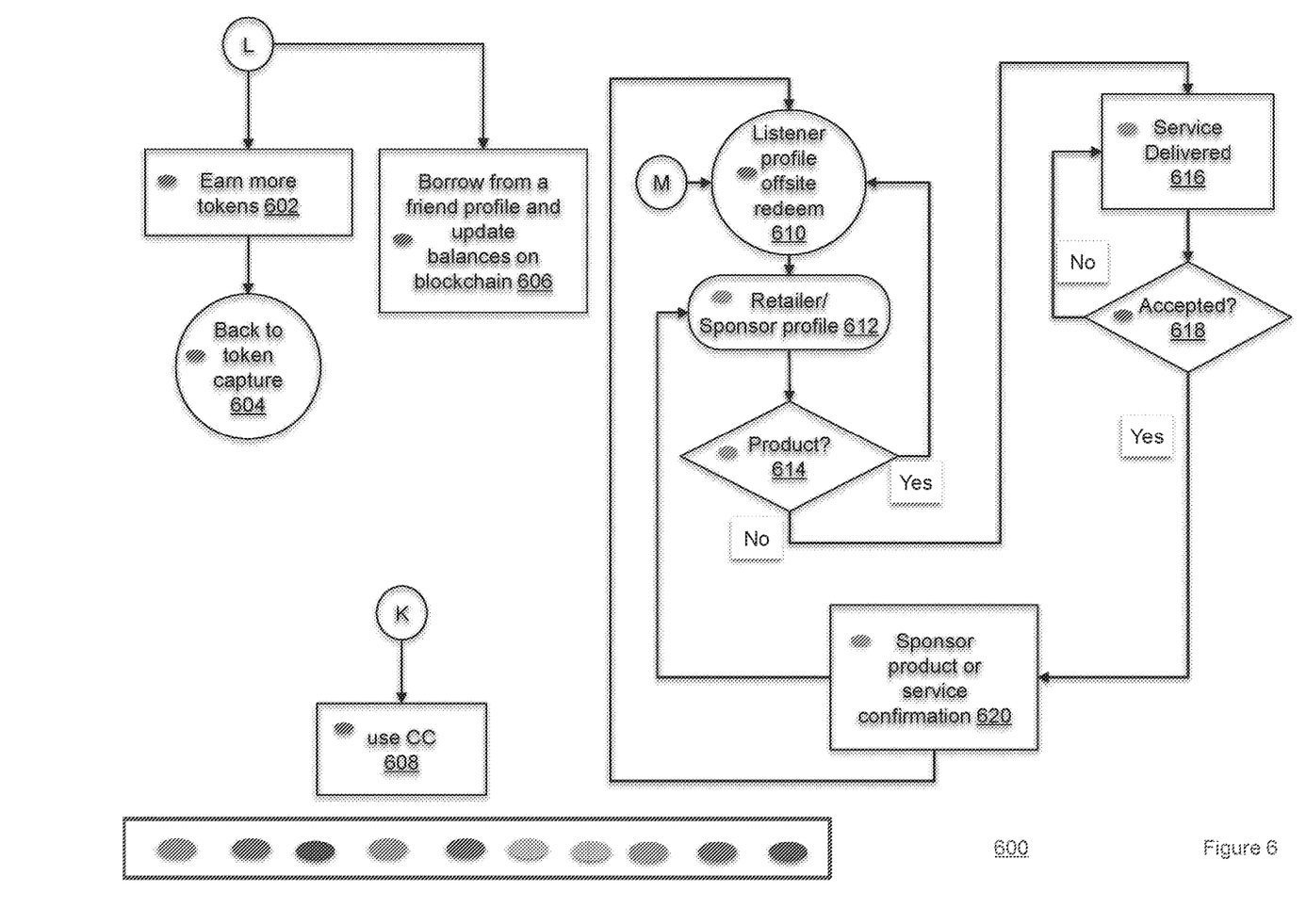

As shown in FIG. 6, in block 602, the server enables a user (e.g. listener profile) to earn more digital utility tokens. In block 604, the server enables token capture through augmented reality. In block 606, the server enables a user (e.g. listener profile) to borrow from a friend profile (e.g. listener profile) and update those balances on the blockchain. In block 608, the server enables a use of a payment card (e.g. credit card, debit card, crypto-currency card). In block 610, the server enables the listener profile to have an offsite redeem of a sponsor objected that has been captured via augmented reality. In block 612, the server reads the sponsor profile (e.g. retailer profile) In block 614 determines the sponsor product is a product and if yes then this product can be redeemed in block 610. Otherwise, in block 616, the server determines that the sponsor product is a service (e.g. membership, tutoring, driving lessons) and confirms that the service was delivered. In block 618, the server determines whether the service was accepted. In block 620, based on the server confirming that the service was accepted, the server send a sponsor product or service confirmation to a user (e.g. listener profile).

Figure 7:
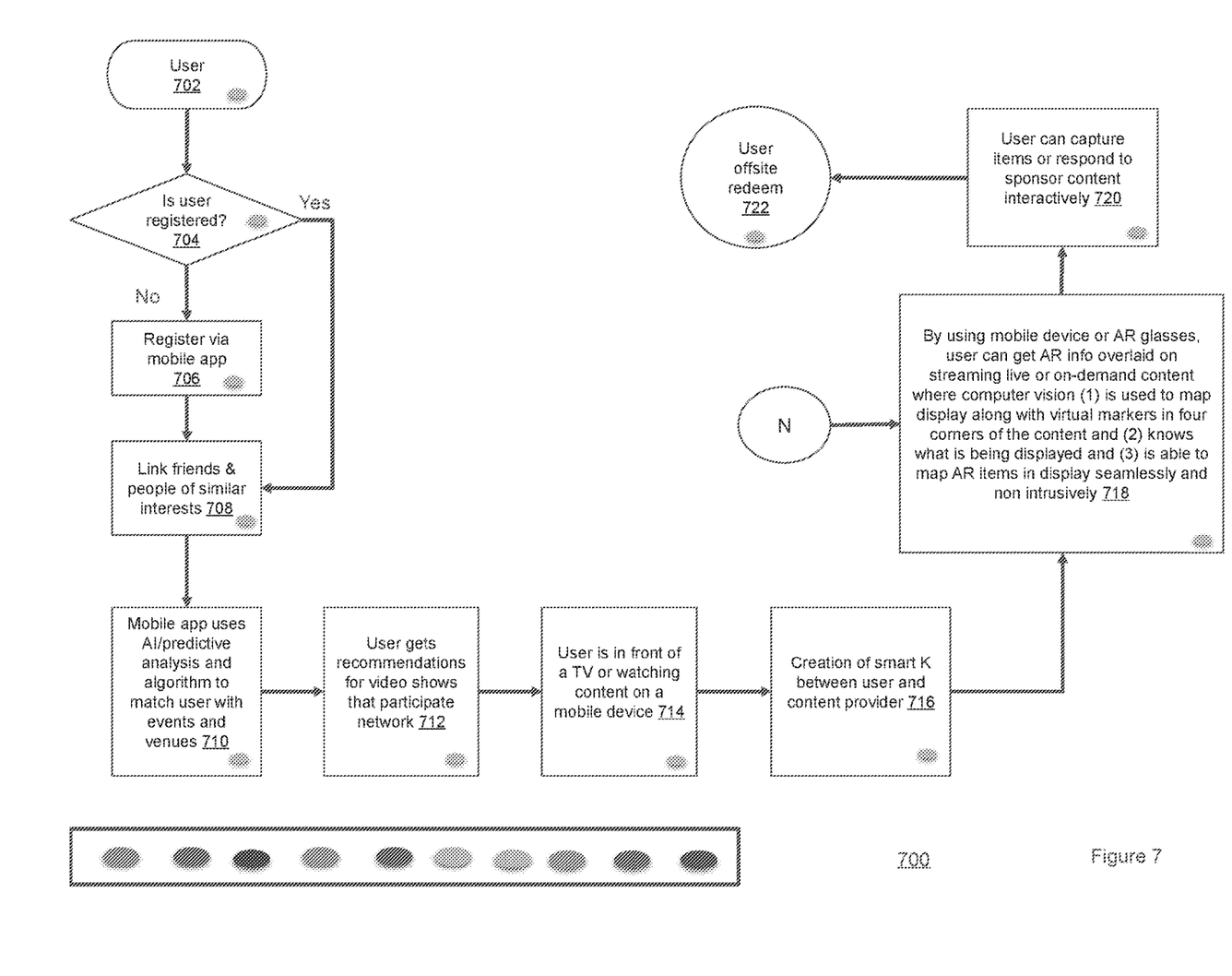

As shown in FIG. 7, in block 702 a computer (e.g. smartphone, tablet, desktop, laptop, wearable) creates a user profile (e.g. mobile app, web application). In block 704, the server determines whether the user profile is registered therewith. In block 706, based on the server determining that the sponsor profile is not registered, then based on communication with the server, the user profile registers with the server. In block 708, based on communication with the server, the user profile can link friends and people of similar interests that have been registered with the server. In block 710, the server employs artificial intelligence or predictive analysis (e.g. machine learning, decision tree learning, association rule learning, neural networks, deep learning, inductive logic programming, support vector machines, clustering, Bayesian networks, representation learning) to match user with events and venues. In block 712, based on communication with the server, the user profile gets recommendations for video shows that participate a communication network, as described herein. In block 714, based on communication with the server, the user profile is associated with a geolocation in proximity (e.g. within about 15, 13, 11, 10, 7, 5, 3 or 1 foot) of a display (e.g. liquid crystal display (LCD), electrophoretic display, television set, digital picture/art frame) or is associated with a video content being play on a mobile device (e.g. smartphone, tablet, eyewear unit, wearable) associated with the user profile. In block 716, the server requests a creation of smart contract between the user profile and a content provider providing the video content. Note that the smart contract can be associated or hosted on the node of the blockchain or another node of another blockchain (e.g. Ethereum-based). In block 718, the server enables the mobile device to get augmented reality content overlaid on streaming live or on-demand video content where computer vision (1) is used to map the display along with a plurality of virtual markers in a plurality of corners (e.g. 2, 3, 4, 5, 6) of the content and (2) identifies what is being displayed (e.g. object recognition) and (3) is able to maps augmented reality content in the display seamlessly and non-intrusively (e.g. non-overlaying center portion, side portion, certain object, certain area). In block 720, the server enables the user profile to capture the augmented reality content or respond to a sponsor content interactively.

Figure 8:
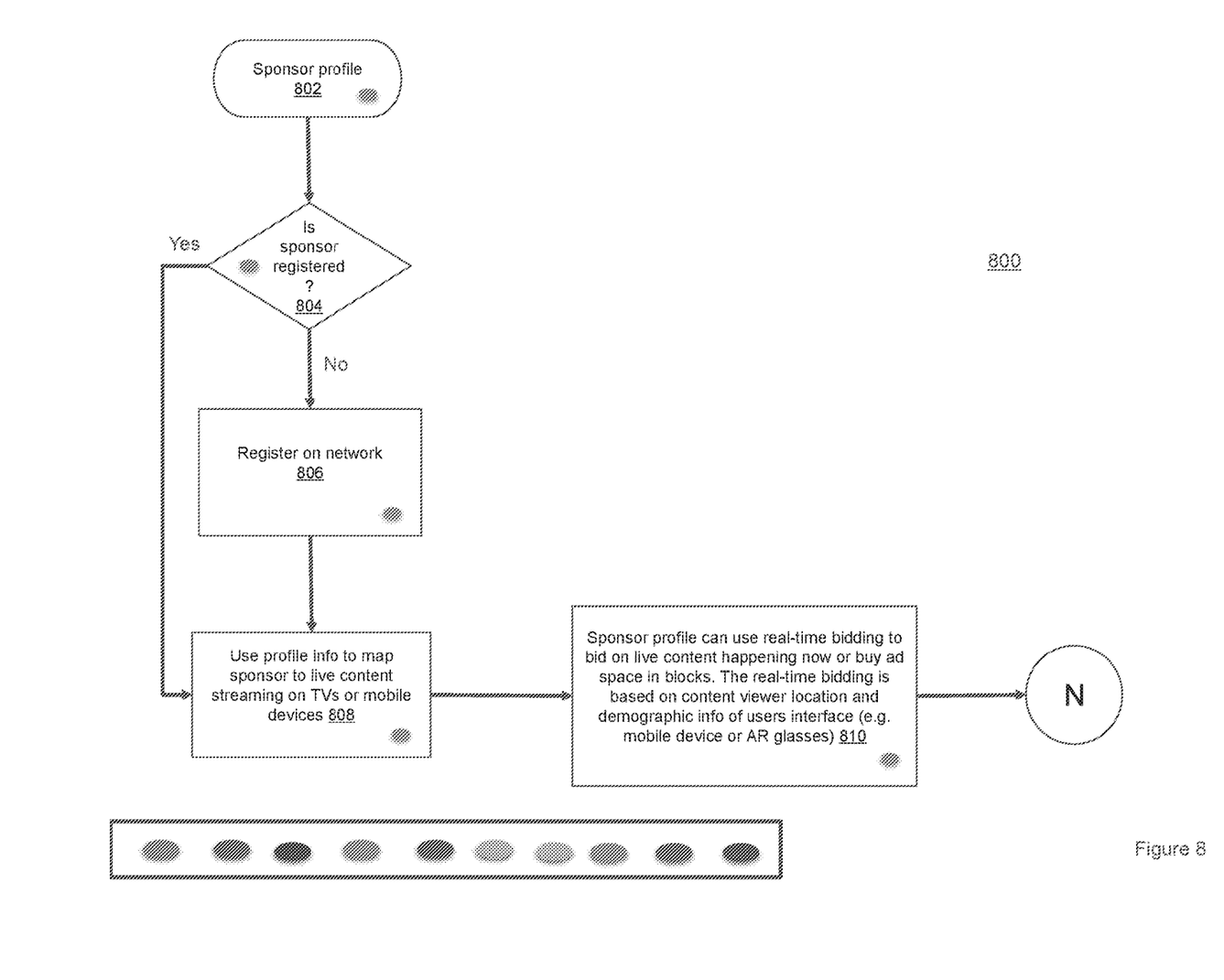

As shown in FIG. 8, in block 802 a computer (e.g. smartphone, tablet, desktop, laptop, wearable) creates a sponsor profile (e.g. mobile app, web application). In block 804, the server determines whether the sponsor profile is registered therewith. In block 806, based on the server determining that the sponsor profile is not registered, then based on communication with the server, the sponsor profile registers with the server. In block 808, based on communicating with the server, the sponsor profile can be used to map sponsor-to-live content streaming on a display (e.g. liquid crystal display (LCD), electrophoretic display, television set, digital picture/art frame) or a mobile device (e.g. smartphone, tablet, eyewear unit, wearable). In block 810, based on communicating with the server, the sponsor profile can use real-time bidding to bid on live content happening now or buy ad space in blocks. The real-time bidding can based on content viewer geolocation (e.g. IP address, longitude/latitude) and demographic info associated with a user interface (e.g. mobile device, eyewear unit, augmented reality glasses).

Figure 9:
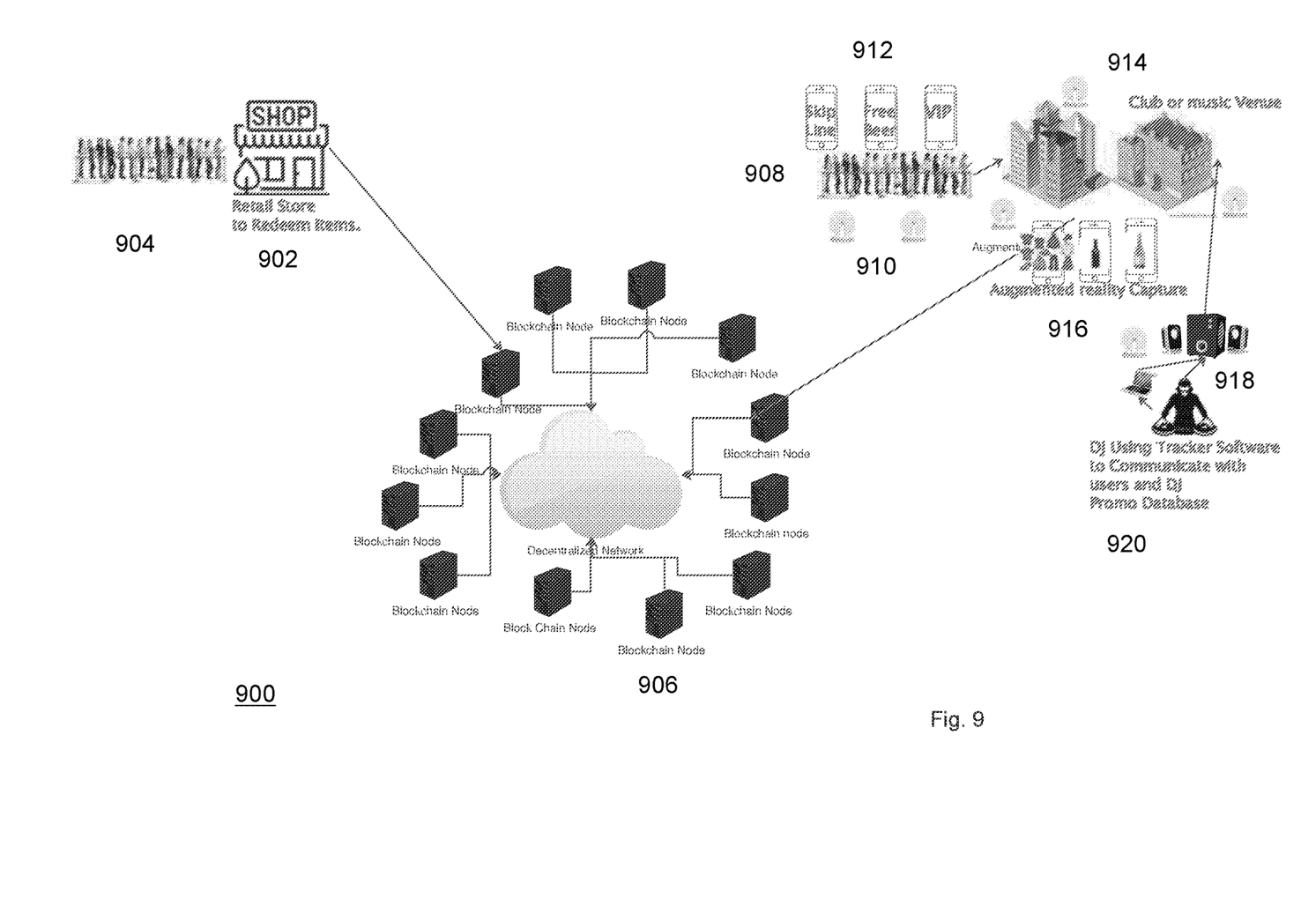
FIG. 9 shows a diagram of an embodiment of a computing system according to this disclosure.

As shown in FIG. 9, a system 900 for use, as described herein, includes a retail store 902 (e.g. POS machine, desktop, laptop), an audience member client 904 in proximity (e.g. externally within about 50, 30, 20, 10, or 5 feet or internally within) of the retail store 902, a node of a blockchain 904 in communication with the retail store 902 (e.g. server-to-server, node-to-node, server-to-client), an audience member client 908, a beacon 910 in outdoor proximity (e.g. within about 20, 17, 15, 13, 11, 9, 7, 5, 3, or 1 foot) of the audience member client 908, a reward message 912 sent to the audience member client 908, a performance venue 914 outside and inside of which the beacon 910 is positioned, an augmented reality content 916 presented on the audience member client 908 based on communication with the node 906, a server 918 in communication with the performance venue 914 (e.g. server-to-server, node-to-node, server-to-client), and a performer client 920 accessing or running a music performance software in communication with the server 918.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening PO controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

Features described with respect to certain example embodiments can be combined and sub-combined in and/or with various other example embodiments. Also, different aspects and/or elements of example embodiments, as disclosed herein, can be combined and sub-combined in a similar manner as well. Further, some example embodiments, whether individually and/or collectively, can be components of a larger system, wherein other procedures can take precedence over and/or otherwise modify their application. Additionally, a number of steps can be required before, after, and/or concurrently with example embodiments, as disclosed herein. Note that any and/or all methods and/or processes, at least as disclosed herein, can be at least partially performed via at least one entity in any manner.

In some embodiments, various functions or acts can take place at a given location and/or in connection with the operation of one or more apparatuses or systems. In some embodiments, a portion of a given function or act can be performed at a first device or location, and a remainder of the function or act can be performed at one or more additional devices or locations.

Various diagrams depicted herein are illustrative. There can be many variations to such diagrams or steps (or operations) described therein without departing from various spirits of this disclosure. For instance, various steps can be performed in a differing order or steps can be added, deleted or modified. All of these variations are considered a part of this disclosure. People skilled in an art to which this disclosure relates, both now and in future, can make various improvements and enhancements which fall within various scopes of various claims which follow.

This detailed description has been presented for various purposes of illustration and description, but is not intended to be fully exhaustive and/or limited to this disclosure in various forms disclosed. Many modifications and variations in techniques and structures will be apparent to those of ordinary skill in an art without departing from a scope and spirit of this disclosure as set forth in various claims that follow. Accordingly, such modifications and variations are contemplated as being a part of this disclosure.

What is claimed is:

1. A method, using a server in communications with a sponsor client, a performance venue client, an audience member client, a DJ client, a music artist client and a blockchain node, for incentivizing musical performances by a DJ application running on the DJ client at a performance venue and promoting a sponsor product via an augmented reality content at the performance venue with a beacon associated with the performance venue client or with a geolocation chip of the audience member client, wherein the beacon is positioned internally or externally at the performance venue and the performance venue client interacts with the audience member client via beacon alerts using the beacon, the method further comprises:

storing, by the server, a sponsor user profile of the sponsor client, a server user profile of the server, a performance venue profile of the performance venue client and a music artist profile of the music artist client, wherein the sponsor user profile (a) comprises a first crypto-asset wallet address, and a digital utility token, and (b) is associated with a sponsor product, and wherein the server user profile comprises a second crypto-asset wallet address;

associating, by the server, the digital utility token associated with the first crypto-asset wallet address of the sponsor user profile with the sponsor product by receiving a first request from the sponsor client;

communicating, by the server, data associated with the sponsor product to the performance venue client;

sending, by the server, information associated with the augmented reality content of the sponsor product to the audience member client within the performance venue;

performing, by the server, a first assignment associated with the digital utility token from the first crypto-asset wallet address of the sponsor user profile to the second crypto-asset wallet address of the server user profile in response to the communicating the data associated with the sponsor product to the performance venue client and the sending the information associated with the augmented reality content of the sponsor product to the audience member client;

sending, by the server, a second request to the blockchain node to record the first assignment associated with the digital utility token from the first crypto-asset wallet address of the sponsor user profile to the second crypto-asset wallet address of the server user profile;

receiving, by the server, an audio content from the DJ application of the DJ client, wherein the audio content from the DJ application is the music being played by the DJ client within the performance venue;

based on the received audio content, accessing, by the server, a database, wherein the database stores a plurality of music piece identifiers and a plurality of crypto-asset wallet addresses, wherein each of the music piece identifiers corresponds to one of the crypto-asset wallet addresses;

comparing, by the server, the received audio content with the music piece identifiers based on the server accessing the database;

determining, by the server, a match between the received audio content and at least one of the music piece identifiers based on the comparison;

based on the determined match, identifying, by the server, at least one of the crypto-asset wallet addresses corresponding to the at least one of the music piece identifiers and the music artist profile associated with the at least one of the music piece identifiers;

performing, by the server, a second assignment associated with a value of the digital utility token from the second crypto asset wallet address of the server user profile to a third crypto-asset wallet address, wherein the third crypto-asset wallet address is the identified at least one of the crypto asset wallet addresses;

sending, by the server, a third request to the blockchain node to record the second assignment of the value of the digital utility token from the second crypto-asset wallet address to the third crypto-asset wallet address; and notifying, by the server, the music artist client of the second assignment based on the identified music artist profile.

2. The method of claim 1, wherein the audio content includes an acoustic fingerprint, wherein the comparing comprises comparing the acoustic fingerprint with the music piece identifiers.

3. The method of claim 1, wherein the receiving the audio content further comprises:
generating, by the server, an acoustic fingerprint based on the received audio content; and
wherein the comparing comprises comparing the generated acoustic fingerprint with the music piece identifiers.

4. The method of claim 1, wherein the music piece identifiers include a plurality of acoustic fingerprints, wherein the comparing comprises comparing the received audio content with the acoustic fingerprints.

5. The method of claim 1, wherein the database is an in-memory database.

6. The method of claim 1, wherein the blockchain node is an Ethereum based node.

7. The method of claim 1, wherein the DJ client is the music artist client.

8. The method of claim 1, wherein the DJ client is not the music artist client.

9. The method of claim 1, wherein the blockchain node is remote from the DJ client and the music artist client.

10. The method of claim 1, wherein at least two of the music piece identifiers correspond to at least one of the crypto-asset wallet addresses.

11. The method of claim 1, wherein at least one of the music piece identifiers corresponds to at least two of the crypto-asset wallet addresses.

12. The method of claim 1, wherein the database stores a record, wherein the record comprises the at least one of the music piece identifiers and the at least one of the crypto-asset wallet addresses.

13. The method of claim 1, wherein the database stores a first record and a second record, wherein the first record comprises the at least one of the music identifiers; and the second record comprises the at least one of the crypt-asset wallet addresses, and
wherein the comparing further comprises:
storing, by the server, a third record in the database, wherein the third record comprises an association of the first record and the second record.

* * * * *